(12) United States Patent
Mueller

(10) Patent No.: US 8,402,650 B2
(45) Date of Patent: Mar. 26, 2013

(54) BUILT-UP CAMSHAFT

(75) Inventor: Oskar Mueller, Thueringerberg (AT)

(73) Assignee: Thyssenkrupp Presta TecCenter AG, Eschen (LI)

( * ) Notice: Subject to any disclaimer, the term of this patent is extended or adjusted under 35 U.S.C. 154(b) by 737 days.

(21) Appl. No.: 11/993,138

(22) PCT Filed: May 23, 2006

(86) PCT No.: PCT/EP2006/004865
§ 371 (c)(1),
(2), (4) Date: Apr. 26, 2010

(87) PCT Pub. No.: WO2006/136252
PCT Pub. Date: Dec. 28, 2006

(65) Prior Publication Data
US 2010/0224145 A1 Sep. 9, 2010

(30) Foreign Application Priority Data

Jun. 20, 2005 (EP) .................................. 05013219

(51) Int. Cl.
*B21D 53/84* (2006.01)
(52) U.S. Cl. ...................................... 29/888.1; 123/90.6
(58) Field of Classification Search ................ 123/90.6, 123/90.15, 90.17, 90.1; 29/888.1; 74/567
See application file for complete search history.

(56) References Cited

U.S. PATENT DOCUMENTS

| 3,734,697 | A | 5/1973 | Sieghartner |
| 4,376,333 | A | 3/1983 | Kanamaru et al. |
| 4,630,498 | A | 12/1986 | Santi |
| 5,272,930 | A | 12/1993 | Nakamura et al. |
| 5,307,708 | A | 5/1994 | Matt |
| 6,416,245 | B1 * | 7/2002 | Matt .............................. 403/282 |
| 6,502,538 | B2 * | 1/2003 | Leuthold ...................... 123/90.6 |
| 7,610,831 | B2 * | 11/2009 | Burgler ........................... 74/567 |
| 2006/0193683 | A1 | 8/2006 | Yokoo et al. |

FOREIGN PATENT DOCUMENTS

| DE | 23 33 040 A1 | 1/1975 |
| DE | 41 21 951 C1 | 12/1992 |
| DE | 42 18 624 A1 | 12/1992 |
| DE | 689 05 065 T2 | 6/1993 |
| FR | 2 704 164 A1 | 10/1994 |
| WO | WO 2004/076095 A1 | 9/2004 |

OTHER PUBLICATIONS

Form PCT/ISA/237 dated Apr. 2005 (Five (5) pages).
International Search Report dated Oct. 19, 2006 with an English translation of the pertinent portions (Seven (7) pages).
Form PCT/IB/338, Form PCT/IB/373, and Form PCT/ISA/237 (Six (6) Pages), Date of mailing Jan. 24, 2008.

\* cited by examiner

*Primary Examiner* — Thomas Denion
*Assistant Examiner* — Daniel Bernstein
(74) *Attorney, Agent, or Firm* — Crowell & Moring LLP

(57) ABSTRACT

A method for producing a built-up cam shaft and a built-up cam shaft having a shaft are provided. A functional component is produced in a separate manufacturing process and has an internal orifice to receive the shaft. The orifice in the functional component is substantially round to receive the shaft, and an insertion mechanism is provided on the raised areas and/or at the orifice in the functional component, which allow the functional component to be pushed onto the raised areas substantially without shavings being produced. The raised areas partially dig into the orifice and in so doing connect the functional component to the shaft in a non-positive and positive manner substantially by deformation of the material of the functional component in the region of the orifice in the functional component.

16 Claims, 4 Drawing Sheets

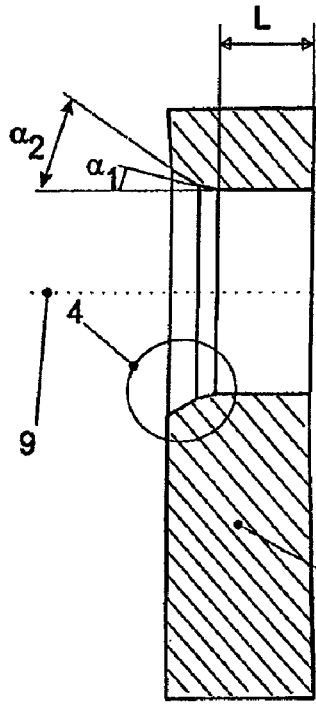
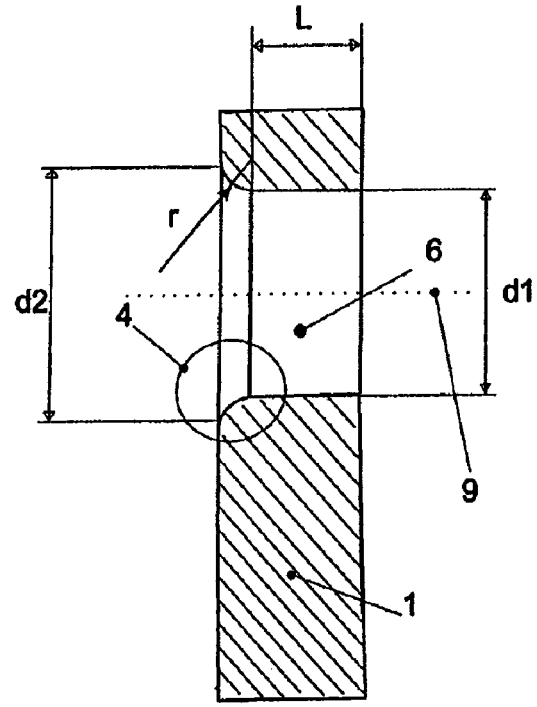
Fig. 3
Fig. 4
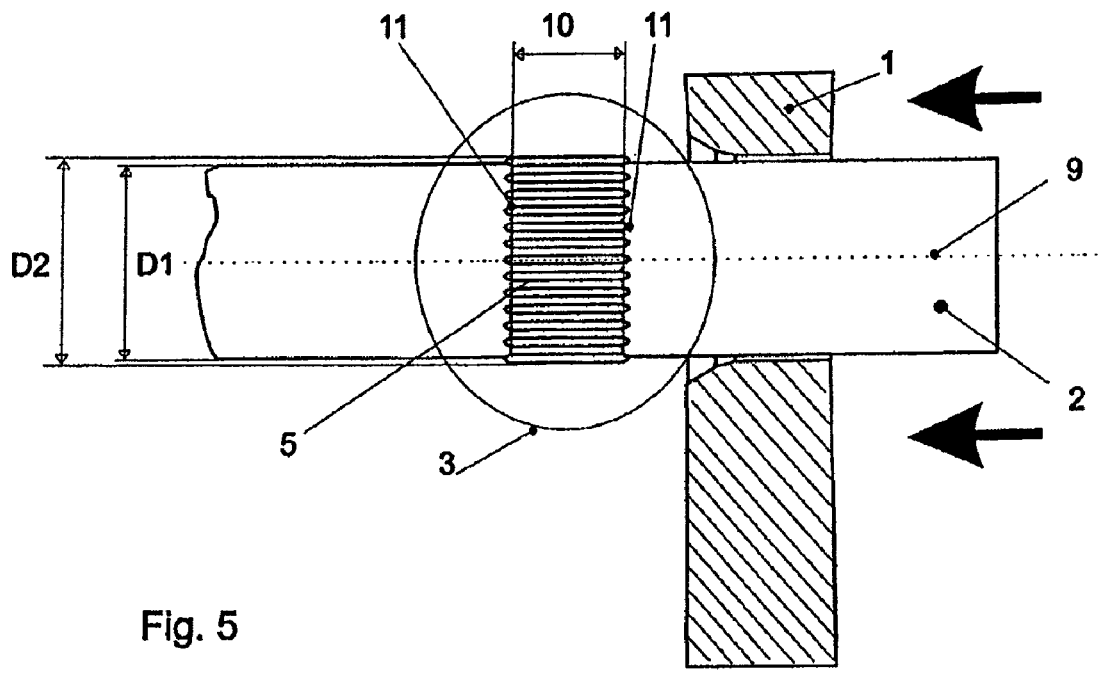
Fig. 5

BUILT-UP CAMSHAFT

The invention relates to a method for producing built-up cam shafts and to cam shafts produced according to this method for internal combustion engines.

In order to produce built-up cam shafts functional elements such as, in particular, cams, drive wheels, bearings, axial bearing discs, sensor rings, cam shaft adjusters and shafts are produced individually. The functional elements are then positioned on the shaft, which serves as a support and drive shaft, and are fixed on the shaft by means of a suitable joining process.

In the prior art a series of joining methods for producing built-up cam shafts are known. In mass production one group of methods amongst others has proved its worth, in which the cam is positioned on the pipe-like support shaft and is then fixed by widening the support shaft using tools or hydraulic pressure (see e.g. DE 689 05 065 T2) These methods are technically extremely involved and require complex joining machines.

With increasing shaft diameters and/or increasing wall thicknesses for the pipe-like support shaft the widening forces and/or pressures required increase very greatly so that the machine technology becomes still more involved. The wearing of the required tools also increases considerably so that operating life is reduced and manufacturing costs rise disproportionately.

In patent document DE 42 18 624 C2 a joining method is presented in which a cam is first formed, wherein a sintered cam part is connected to a steel ring by diffusion bonding. The steel ring has a polygonal orifice to receive the support shaft. The cam is then joined to the support shaft by a press fit. For this purpose the support shaft is widened by knurling and the steel ring, with the sintered cam fixed thereto, is pushed over the support shaft.

Significant disadvantages of this method are the complex manufacture of the cam, consisting of two components (steel ring and sintered body), and the polygonal orifice in the steel ring. The considerable deformation forces do not permit cams to be used without steel rings. The deformation forces thus increase sharply as the shaft diameter increases. In addition, considerable maximum overlapping areas between the knurling and cam orifice are required. In order to achieve the necessary transferable turning moments overlapping areas are required in which it is almost impossible to avoid the formation of shavings. In addition, as the shaft diameters have increased greater demands have been placed on the precision of the knurling operation as otherwise the risk of creating shavings is further increased.

In addition, the method in accordance with DE 41 21 951 C1 for mass producing cam shafts has proved its worth. In accordance with this method, regions of the support shaft are widened beyond the original shaft diameter by means of thread-like rolling and then the cams are pushed on, the internal orifices of which have a diameter smaller than the outer diameter of the widened shaft region. The forged cam has a funnel-like insertion cone. Within this cone region the rolled beads are deformed during assembly so that the cam is widened somewhat and a press fit between the cam and support shaft is produced.

A particular advantage of this method is that the process of joining each individual cam can be monitored by measuring the pressing force. In so doing, the progression of the force curve over the pressing path exhibits a very strong initial rise when the first rolled bead comes into contact with the internal orifice of the cam and then a further wave-like rise until the cam is fully joined over the widened region. Each wave of the rise corresponds to the entry of a further rolled bead into the joining region between the cam and support shaft. Tests have shown a correlation between the maximum pressing force and the transferable turning moment between the cam and support shaft.

A disadvantage of this technology, however, is that in the case of large shaft diameters, as required for example for vehicle engines in utility vehicles, the forces increase disproportionately and, in addition, the differences between the wave trough and wave peak in the force progression curve greatly increase. Although as a rule in the case of cam shafts with larger shaft diameters, greater transferable turning moments are also required between the cam and support shaft, the method known from the prior art is often greatly over-dimensioned. This results in assembly machines being used which must apply extremely large pressing forces and in uncertainty in evaluation of the quality of the connection owing to the large fluctuation between the maximum and minimum pressing force in each wave of the force increase.

In addition, with increasing shaft diameters increased demands are placed on precision during rolling or otherwise the risk of creating shavings arises.

Furthermore, for the methods in accordance with the prior art it is to be observed that as the shaft diameter increases the length of the cam shaft often also becomes greater so that the requirements placed on the assembly machines increase owing to the increased pressing forces as the distances between the clamping points become greater.

It is the object of the invention to provide an inexpensive mass-producible connection for functional components such as e.g. bearings, cams, drive wheels, axial bearing discs, control discs, sensor rings or cam shaft adjusters with support shafts in order to produce built-up cam shafts. In so doing, the functional components can be produced both from steel and also sintered material or other materials and the connection between the functional component and support shaft should be strong in the peripheral direction (moment transfer) and in the longitudinal direction of the support shaft.

Furthermore, it is the object of the invention to improve the possibilities for process monitoring and to keep the forces arising during manufacture as low as possible. Furthermore, in the simplest way possible a non-positive and positive connection should be produced. In particular, the transferable turning moments should be as great as possible.

Furthermore, a cam shaft should be provided, in particular for larger support shaft diameters, as required e.g. in the case of utility vehicles, which can be produced easily and inexpensively in high volumes, with reduced assembly forces and with greater processing safety.

With respect to the method the object is achieved with a method for producing a built-up cam shaft in order to control valves of internal combustion engines having a shaft and at least one functional component which is produced in a separate manufacturing process and has an internal orifice to receive the shaft, wherein, at least in the region in which the functional component is to be attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the pipe, and wherein the functional component with its orifice is threaded onto the shaft and is connected to the shaft by being pushed onto the raised areas, characterised in that the orifice in the functional component is substantially round to receive the shaft, and that insertion means are provided on the raised areas and/or at the orifice in the functional component, which allow the functional component to be pushed onto the raised areas substantially without shavings being produced, wherein substantially by deformation of the material of the functional component in the region of the orifice in the functional component the raised areas partially dig into this orifice and in so doing connect the functional component to the shaft in a non-positive and positive manner.

The insertion means can be formed as run-in chamfers formed at the orifice in the functional component and/or formed by a knurled run-in formed on the raised areas and widened in a funnel-like manner.

In a first embodiment of the invention the object is actually achieved by a method for producing a built-up cam shaft in order to control valves of internal combustion engines having a shaft and at least one functional component which is produced in a separate manufacturing process and has an internal orifice to receive the shaft, wherein, at least in the region in which the functional component is to be attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, and wherein the functional component with its orifice is threaded onto the shaft and is connected to the shaft by being pushed onto the raised areas, characterised in that the orifice in the functional component is substantially round to receive the shaft and is widened in a funnel-like manner at least on one side and at least over a part of its axial length, wherein the orifice has a mouth with a diameter which corresponds at least to the diameter of the widened shaft region, and has a diameter in the region not widened in a funnel-like manner which is formed somewhat larger than the diameters of the shaft next to the widened region and somewhat smaller than the diameters described by the raised areas distributed over the outer periphery of the shaft, and that the functional component with the side widened in a funnel-like manner is first pushed over the widened region of the shaft, wherein substantially by deformation of the material of the functional component in the region of the orifice in the functional component the raised areas partially dig into this orifice and in so doing connect the functional component to the shaft in a non-positive and positive manner.

In an alternative embodiment the method for producing a built-up cam shaft is changed in such a way that the orifice in the functional component is substantially round to receive the shaft and the raised areas comprise a knurled run-in on at least one side, wherein the diameter of the knurled run-in described by the raised areas is widened in a funnel-like manner starting from the edge of the knurled run-in, wherein the smallest diameter of the knurled run-in is smaller than and the diameter in the part not enlarged in a funnel-like manner is larger than the smallest diameter of the orifice in the functional component, and wherein the functional component is pushed over the diameter of the support shaft which is widened in a funnel-like manner, wherein substantially by deformation of the material of the functional component in the region of the orifice in the functional component the raised areas partially dig into this orifice and in so doing connect the functional component to the shaft in a non-positive and positive manner.

With respect to the cam shaft the object is achieved by a cam shaft for controlling valves of internal combustion engines having a shaft and at least one functional component which is produced in a separate manufacturing process and has an internal orifice to receive the shaft, wherein, at least in the region in which the functional component is attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, characterised in that the orifice in the functional component is substantially round to receive the shaft and that on the raised areas and/or at the orifice in the functional component insertion means are provided which permit the functional component to be pushed onto the raised areas substantially without producing shavings, wherein substantially by deformation of the material of the functional component in the region of the orifice in the functional component the raised areas have partially dug into this orifice and the functional component is thus connected to the shaft in a non-positive and positive manner.

The insertion means can be formed as run-in chamfers formed at the orifice in the functional component and/or can be formed by a knurled run-in formed on the raised areas and widened in a funnel-like manner.

In a first embodiment of the cam shaft in accordance with the invention the object is achieved by a cam shaft for controlling valves of internal combustion engines having a shaft and at least one functional component which is produced in a separate manufacturing process and has an internal orifice to receive the shaft, wherein, at least in the region in which the functional component is attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, characterised in that the orifice in the functional component is substantially round to receive the shaft and is widened in a funnel-like manner at least on one side and at least over a portion of its axial length, wherein the orifice has a mouth with a diameter which corresponds at least to the diameter of the widened shaft region, and has a diameter in the region not widened in a funnel-like manner which is formed somewhat larger than the diameter of the shaft next to the widened region and somewhat smaller than the diameter described by the raised areas distributed over the outer periphery of the shaft, wherein substantially by deformation of the material of the functional component in the region of the orifice in the functional component the raised areas have partially dug into this orifice and the functional component is thus connected to the shaft in a non-positive and positive manner.

In an alternative embodiment a cam shaft for controlling valves of internal combustion engines is proposed in which the orifice in the functional component is substantially round to receive the shaft and the raised areas have a knurled run-in on at least one side, wherein the diameter of the knurled run-in described by the raised areas is widened in a funnel-like manner starting from the edge of the knurled-run-in, wherein the smallest diameter of the knurled run-in is smaller than and the diameter in the part not enlarged in a funnel-like manner is larger than the smallest diameter of the orifice in the functional component, wherein substantially by deformation of the material of the functional component in the region of the orifice in the functional component the raised areas have partially dug into this orifice and the functional component is thus connected to the shaft in a non-positive and positive manner.

By reason of the fact that the raised areas of the region of the support shaft widened by knurling merge and/or dig into the material of the functional component in the region of its orifice as it is being pushed on, and the displaced material of the functional component partially flows around the raised areas a positive connection is formed on the one hand which is effective in the peripheral direction and which ensures a high level of firmness in the connection in the peripheral direction. In this way large moments acting in the peripheral direction can be transferred as is necessary e.g. in the case of cams of a cam shaft.

On the other hand, the material of the functional component, which is subject to mechanical stress owing to the merging or digging in of the raised areas exerts a pressing force on the support shaft (i.e. on the raised areas) owing to the resilience of the material. In this way a high surface pressure, by means of which a non-positive connection is achieved, arises between the mutually contacting surfaces of the orifice in the functional component and the outer surfaces of the raised areas. This non-positive connection ensures a high level of firmness in the connection in the direction of the longitudinal axis of the support shaft. By means of this non-positive and positive connection the connection is particularly tolerant of alternating dynamic stresses in the peripheral direction.

The invention is explained in more detail hereinunder with the aid of drawings. The schematic drawings illustrate the invention with the aid of a preferred embodiment in which:

FIG. 1 shows a three-dimensional illustration of an embodiment of the functional component in accordance with the invention, a cam 1a;

FIG. 3, FIG. 4 show a longitudinal cross-sectional view through a cam in accordance with the invention with a different run-in chamfer 4;

FIG. 5 shows an illustration of the joining process of the built-up cam shaft;

In the illustrated preferred embodiment the support shaft 2 is formed in a pipe-like manner.

Figure 1:
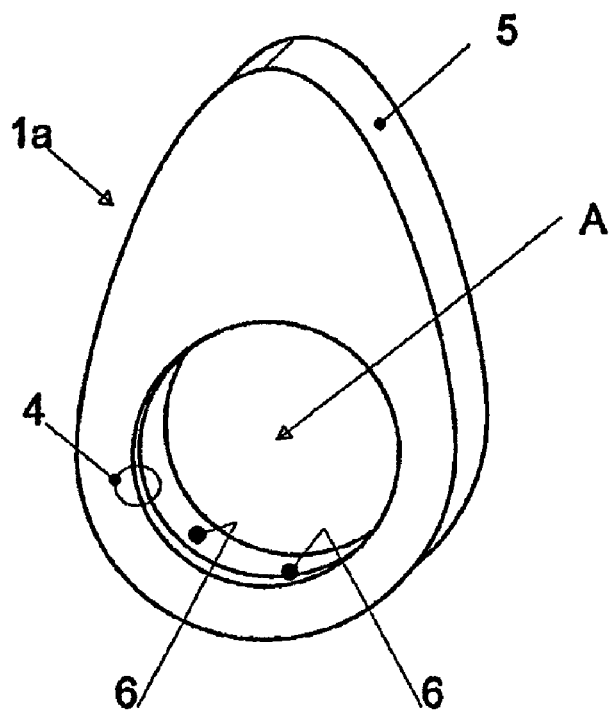
Figure 2:
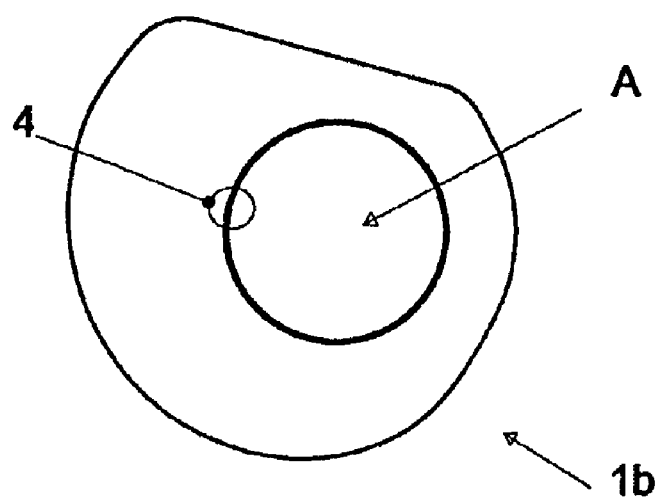
FIG. 2 shows an embodiment of the functional component in accordance with the invention, an eccentric disc 1b.

The functional component, a cam 1a corresponding to FIG. 1, an eccentric disc 1b corresponding to FIG. 2 or even a bearing ring, a sensor ring, a drive wheel or another element has an internal orifice A to receive the support shaft 2 with an opening diameter d1 (cf. FIG. 4). The diameter d1 is constant over the joining length L (cf. FIG. 3, 4). The internal orifice has a run-in chamfer 4 which has an opening diameter d2 at its mouth and extends into the opening diameter d1 of the orifice A.

The orifice A in the functional component 1 has a substantially circular cross-section and the surface 6 of the internal orifice A is preferably smooth. In particular the surface 6 of the internal orifice A has no corners or other points of discontinuity in the peripheral direction. In the simplest and preferred case the orifice A has a circular cross-section as may be produced by rough turning, drilling, sintering or even forging without any finishing work. It will be understood that the terms "round", "circular" and "smooth" are not to be understood in the strictly mathematical sense but the shape of the orifice may deviate from being purely circular owing to manufacturing tolerances and unavoidable technical inaccuracies. The proposed solution uses the whole periphery of the orifice A to build up the non-positive and positive connection.

Two different run-in shapes can alternatively be selected for the run-in chamfer 4. FIG. 3 shows two conical portions disposed one after the other in the direction of the support shaft axis 9 and having outwardly directed cone angles $\alpha 1$, $\alpha 2$ which increase towards the end face of the cam, preferably by three to seven times. In contrast, FIG. 4 shows a run-in radius r as the run-in chamfer.

Figure 6:
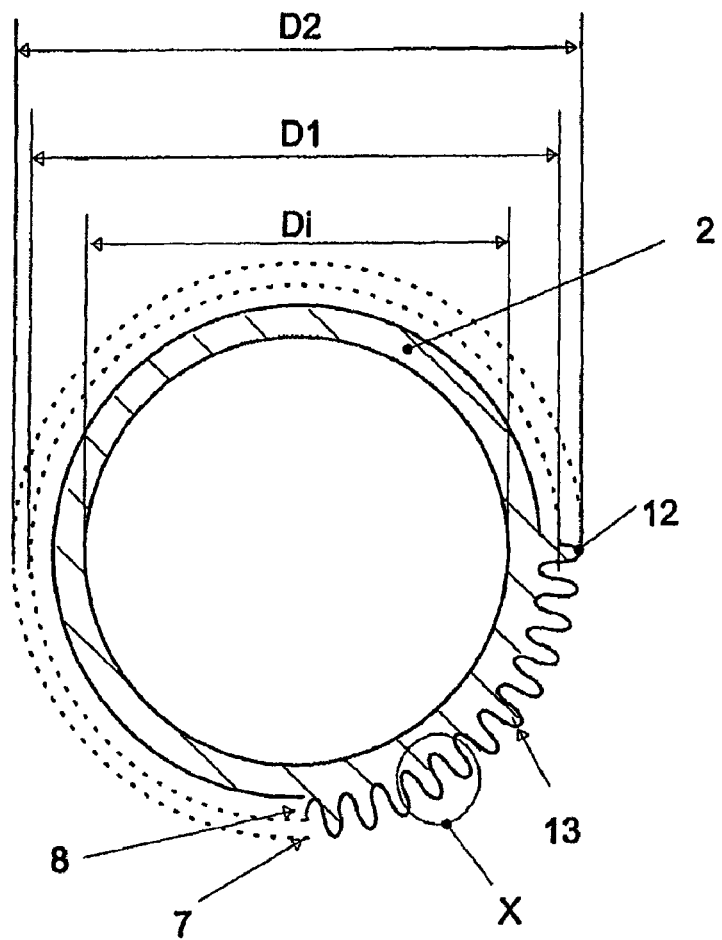
FIG. 6 shows a cross-sectional view through the support shaft 2 in the widened region.

The support shaft 2 with an outer diameter D1 is widened by means of knurling to the diameter D2 in the region 3 to which the functional component 1 is to be joined. In so doing the knurling operation forms raised areas 7 and depressions 8 (cf. FIG. 6, 7), wherein the inner diameter Di is not reduced or is only slightly reduced. The raised areas 7 are divided into two knurled run-ins 11 and a raised area length 10 between the knurled run-ins 11.

The joining operation is effected in such a way that, as shown in FIG. 5, the functional component 1 is first pushed with its run-in chamfer 4 in the direction indicated by the arrow over the widened region 3 of the support shaft 2 and in so doing forms a non-positive and positive connection with the support shaft.

The invention is based on the recognition that the maximum turning moments can be transferred when forming a non-positive and positive connection between the functional component 1 and the support shaft 2. When pushing the functional component 1 onto the widened region of the shaft 2 the formation of shavings must be avoided to the greatest possible extent because tests have shown that the formation of shavings reduces the transferable turning moment since material is broken out of the joining gap and can therefore no longer contribute to the positive connection and/or to the build-up of stress and therefore to the non-positive connection. During deformation, by means of which the raised areas of the support shaft dig into the orifice in the functional component 1, care must be taken that each volume region in the joining zone is deformed a maximum of only once in the course of the pressing operation. Otherwise this may result in cavities and stress losses and therefore in a reduction in the positive and/or non-positive connection.

For this reason it is particularly significant that the raised areas 7 in the widened region of the support shaft 2 are directed as precisely as possible in the longitudinal direction of the support shaft 2 and therefore parallel to the axis 9 of the support shaft. In an advantageous development the raised areas 7 have the most constant height and cross-sectional shape possible over their whole length 10, apart from the region of the knurled run-in 11. In particular this means that the raised areas are formed with a constant cross-section over the greatest length possible. In the region of the knurled run-in 11 the raised areas 7 are smaller in terms of height and cross-section than in the remaining region 10 of the widening 3.

Figure 7:
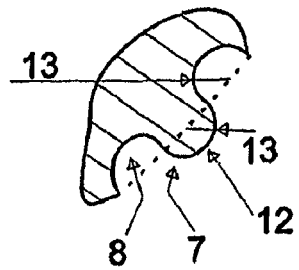
FIG. 7 shows a cross-sectional view through the widened areas in another embodiment in the widened region of the support shaft 2 corresponding to section X of FIG. 6.

Furthermore, it is particularly advantageous to make the raised areas 7 as hard as possible, which can be effected e.g. just by cold work hardening of the support shaft material during knurling. By repeated circulation of the knurling tool on one and the same support shaft portion 3 this cold work hardening can be increased further. However, care must be taken that the deformation property of the material of the support shaft 2 is not exceeded and shavings thereby produced. The raised areas should also not be formed into a point because that would promote the formation of shavings. In other words the radii 13 of the raised area peaks 12 should not be too small. In particular it is advantageous if the cross-sectional contour through the raised area 7 and depression 8 can be described as closely as possible by two semi-circles which extend into each other and have the radius 13 as schematically illustrated in FIG. 7.

Figure 8:
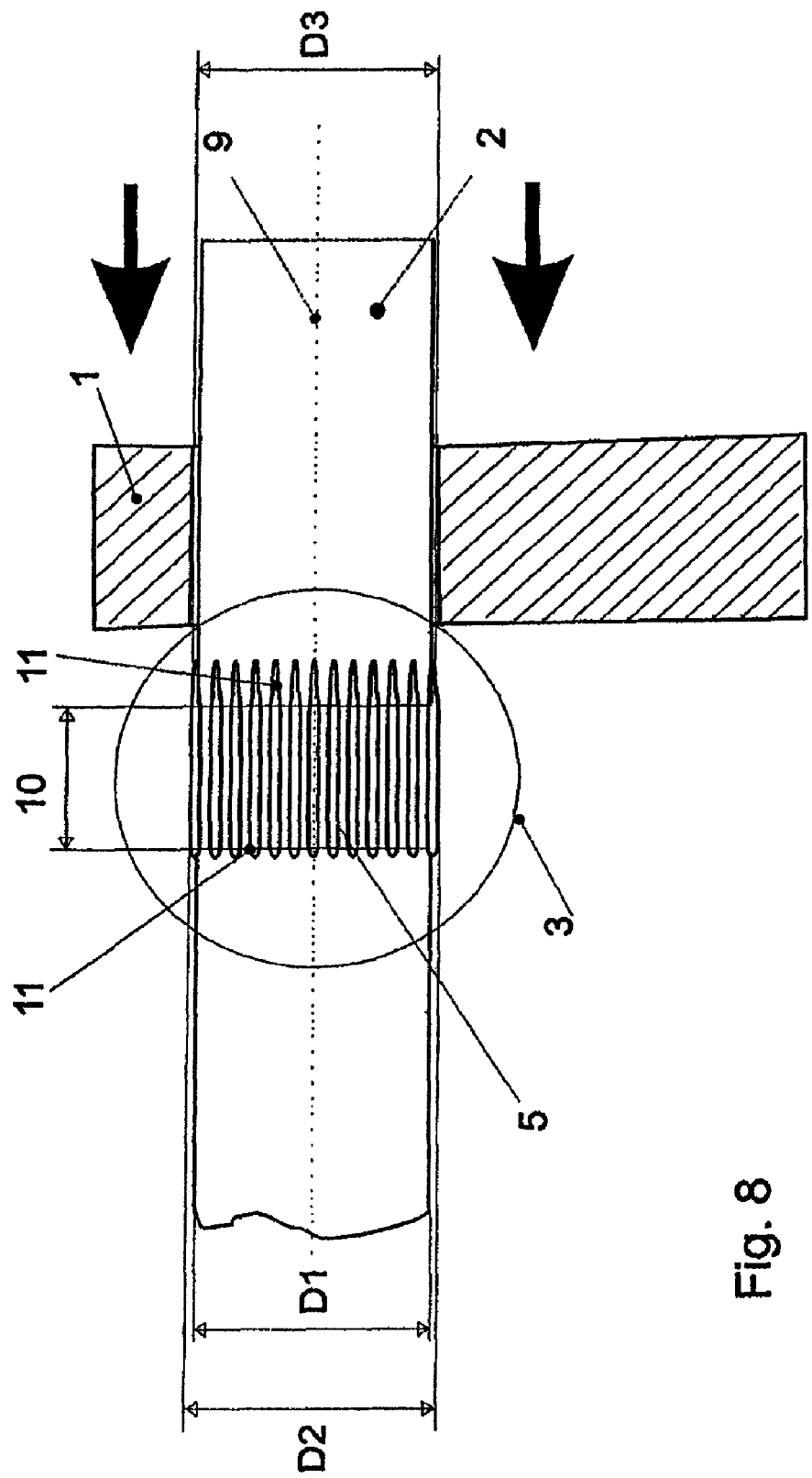
FIG. 8 shows the same view as FIG. 7 but with an alternative embodiment.

In an alternative embodiment (see FIG. 8) the run-in chamfer 4 is not formed at the orifice in the functional component or is reduced to a simple edge fracture or deburred area. In this embodiment a specially formed knurled run-in 11 adopts this function. The knurled run-in 11 is formed in such a way in this embodiment that the diameter described by the raised areas 7 is enlarged in a funnel-like manner from the edge of the knurling over which the functional component is pushed during assembly. The diameter D3 at the edge of the knurling is thus smaller than and the maximum diameter of the knurled run-in 11 is larger than the diameter d1 of the orifice A in the functional component. The axial diameter progression of the widened region 3 of the support shaft 2 is preferably analogous to the above-described funnel-like widening of the orifice A in the functional component. The advantage of this design is that the functional component does not have to be provided with a run-in chamfer. However, the production of knurling such as this is more complex so that in this case a decision must be made depending on the actual application.

In principle it would suffice to provide a knurled run-in 11 at only one end of the knurling, wherein the functional component 1 must then definitely be pushed onto the shaft 2 in the direction towards the knurled run-in 11.

Furthermore, it is advantageous if the functional component 1 is not widened plastically but only slightly elastically by being pushed onto the widened region of the support shaft. In this way the functional component experiences less tensile stress, whereby the risk of fracture is reduced and the fluctuation in the geometry of the outer surface 5 of the functional component 1 is reduced. In so far as elastic widening of the functional component 1 by being pushed onto the support shaft 2 is unavoidable or is necessary in order to achieve a sufficient non-positive connection, this widening on the outer surface of the functional component 1 should not exceed a dimension of 0.2 mm in diameter. Widening diameters of less than 0.05 mm are preferred wherein there is ideally no measurable widening on the outer periphery.

By each of these individual measures the overlap required for the connection is reduced—while the transferable turning moments remain equal—as a difference between the diameter d1 of the orifice A in the functional component 1 and the diameter D2 described by the raised areas 7 on the support shaft 2. Thus for a connection which is sufficient for cam shafts overlaps of only 0.05 mm to 0.2 mm will suffice, which corresponds to a height of the raised areas 7 of about 0.1 mm to 0.3 mm.

In particular applications e.g. in the case of very large diameters D1 it may be advantageous to provide two or more mutually spaced widened areas within a joining length L on the support shaft 2. In this way the pressing forces can be further limited but by this means the transferable turning moment is reduced.

The assembly method proposed in the present invention provides a series of advantages. By using an internal orifice with a circular cross-section in the functional components these components become very simple to produce. Thus, for example, cams can be produced by sintering but also by cold or hot forging and virtually without any finishing work. The run-in chamfer can be integrally formed directly in the manufacturing process. It is possible to dispense with complex reaming finishing work and in part even to dispense with turning finishing work. Neither small toothing nor oval areas or polygonal internal contours need to be introduced into the orifice.

When pressing on the functional component a uniform material deformation of the functional component material takes place in the region of the orifice so that stress peaks are avoided. The material at the surface of the internal orifice is displaced by the raised areas on the support shaft and in so doing flows around the raised areas. Depending on the difference in diameter between the orifice A and support shaft 2 the material even flows partially into the depressions 8 on the support shaft 2. In this way a very good positive connection is produced. At the same time the residual elasticity of the local plastic deformations contributes to the non-positive connection owing to the resilience of the material of the functional component even if the functional component has not been widened at all by being pushed on. The raised areas 7 are virtually clamped in at their side flanks by the material of the functional component plastically formed around them. In general, the functional component is additionally widened in a slightly elastic—but in no way plastic—manner so that in this way a non-positive connection is additionally enhanced owing to the resilience of the material.

The cam shafts produced according to this method withstand particularly well the alternating loading caused by the alternating moment in engine operation. The large-surface positive connection with the elastic prestressing leads to a reduction in the difference between the tolerable static loading and the tolerable dynamic alternating loading.

It is not possible to achieve such a good positive and non-positive connection either with rolled raised areas in the peripheral direction of the support shaft nor with a polygonal cross-section for the orifice in the functional component.

At the same time the increase in force during the phase of pressing the functional component onto the widened shaft region is almost constant or at least increases uniformly so that a very good and simple quality control (i.e. control of the joining process by measuring and monitoring the progression of the pressing force) is made possible.

REFERENCE LIST 1 functional component
1a cam
1b eccentric disc
2 support shaft
3 widened region
4 run-in chamfer
5 outer surface
6 inner surface
7 raised area
8 depression
9 support shaft axis
10 raised area length
11 knurled run-in
12 peak of raised area
13 radius
A cam orifice
L joining length
X section
d1 diameter of cam orifice
d2 diameter of mouth
r run-in radius
D1 outer diameter of shaft
D2 diameter of widened region
$\alpha_1$ run-in chamfer angle
$\alpha_2$ run-in chamfer angle

The invention claimed is:

1. Method for producing a built-up cam shaft in order to control valves of internal combustion engines having a shaft and at least one functional component which is produced in a separate manufacturing process and has an internal orifice to receive the shaft, wherein, at least in a region in which the functional component is to be attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, and wherein the functional component with its orifice is threaded onto the shaft and is connected to the shaft by being pushed onto the raised areas, wherein the orifice in the functional component is substantially round to receive the shaft, and insertion means are provided on the raised areas and/or at the orifice in the functional component, which allow the functional component to be pushed onto the raised areas substantially without shavings being produced, wherein substantially by deformation of the material of the functional component in the region of the orifice in the functional component the raised areas partially dig into this orifice and in so doing connect the functional component to the shaft in a non-positive and positive manner, wherein the functional component is widened by the joining process by no more than 0-2 mm in relation to the starting diameter of the outer contour of the non-joined function component.

2. Method as claimed in claim 1, wherein the insertion means are formed by a run-in chamfer formed at the orifice in the functional component.

3. Method as claimed in claim 2, wherein in order to form the run-in chamfer the orifice in the functional component is widened in a funnel-like manner at least on one side and at least over a part of its axial length, wherein the orifice has a mouth with a diameter which corresponds at least to a diameter of the region of the shaft in which the functional component is to be attached, and has a diameter in the region not widened in a funnel-like manner which is formed larger than the diameter of the shaft next to the widened region and smaller than the diameter described by the raised areas distributed over the outer periphery of the shaft, wherein the functional component with the side widened in a funnel-like manner is first pushed over the widened region of the shaft.

4. Method as claimed in claim 1, wherein the insertion means are formed by a knurled run-in formed on the raised areas.

5. Method as claimed in claim 4, wherein the raised areas comprise a knurled run-in on at least one side, wherein the diameter of the knurled run-in described by the raised areas is widened in a funnel-like manner starting from the edge of the knurled run-in, wherein the smallest diameter of the knurled run-in is smaller than and the diameter in the part not enlarged in a funnel-like manner is larger than the smallest diameter of the orifice in the functional component, and wherein the functional component is pushed over the diameter of the support shaft which is widened in a funnel-like manner.

6. Method as claimed in claim 1, wherein the raised areas have a constant cross-section over the majority of their length.

7. Method as claimed in claim 1, wherein the functional component is widened by no more than 0.05 mm in relation to the starting diameter of the outer contour of the non-joined functional component.

8. Method as claimed in claim 1, wherein during the pressing process an almost constant, at least uniformly increasing rise in the pressing force takes place.

9. Cam shaft for controlling valves of internal combustion engines having a shaft and at least one functional component which is produced in a separate manufacturing process and has an internal orifice to receive the shaft, wherein, at least in a region in which the functional component is attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, wherein the orifice in the functional component is substantially round to receive the shaft and on the raised areas and/or at the orifice in the functional component insertion means are provided which permit the functional component to be pushed onto the raised areas substantially without producing shavings, wherein substantially by deformation of the material of the functional component in the region of the orifice in the functional component the raised areas have partially dug into this orifice and the functional component is thus connected to the shaft in a non-positive and positive manner, wherein the functional component is widened by the joining process by no more than 0-2 mm in relation to the starting diameter of the outer contour of the non-joined function component.

10. Cam shaft as claimed in claim 9, wherein the insertion means are formed by a run-in chamfer formed at the orifice in the functional component.

11. Cam shaft as claimed in claim 10, wherein in order to form the run-in chamfer the orifice in the functional component is widened in a funnel-like manner at least on one side and at least over a portion of its axial length, wherein the orifice has a mouth with a diameter which corresponds at least to a diameter of the region of the shaft in which the functional component is to be attached, and has a diameter in the region not widened in a funnel-like manner which is formed larger than the diameter of the shaft next to the widened region and smaller than the diameter described by the raised areas distributed over the outer periphery of the shaft.

12. Cam shaft as claimed in claim 9, wherein the insertion means are formed by a knurled run-in formed on the raised areas.

13. Cam shaft as claimed in claim 12, wherein the raised areas have a knurled run-in on at least one side, wherein the diameter of the knurled run-in described by the raised areas is widened in a funnel-like manner starting from the edge of the knurled-run-in, wherein the smallest diameter of the knurled run-in is smaller than and the diameter in the part not enlarged in a funnel-like manner is larger than the smallest diameter of the orifice in the functional component.

14. Cam shaft as claimed in claim 9, wherein the raised areas are formed with a constant cross-section over the majority of their length.

15. Cam shaft as claimed in claim 9, wherein at least one functional component is a cam which is produced by forging or sintering.

16. A cam shaft for controlling valves of internal combustion engines having a shaft and at least one functional component which is produced in a separate manufacturing process and has an internal orifice to receive the shaft, wherein, at least in the region in which the functional component is attached, the shaft is widened at least in portions by material deformation of the outer periphery of the shaft by means of knurling, wherein raised areas distributed over the outer periphery of the shaft and extending in the longitudinal direction of the shaft axis are formed on the outer surface of the shaft, wherein the orifice in the functional component is substantially round to receive the shaft and on the raised areas and/or at the orifice in the functional component insertion means are provided which permit the functional component to be pushed onto the raised areas substantially without producing shavings, wherein substantially by deformation of the material of the functional component in the region of the orifice in the functional component the raised areas have partially dug into this orifice and the functional component is thus connected to the shaft in a non-positive and positive manner, wherein the functional component is not elastically widened by the joining process or at least is elastically widened by no more than 0.05 mm in relation to the starting diameter of the outer contour of the non-joined functional component.

* * * * *